(12) United States Patent
Fujita

(10) Patent No.: US 8,147,764 B2
(45) Date of Patent: Apr. 3, 2012

(54) HONEYCOMB STRUCTURE AND EXHAUST GAS TREATING APPARATUS

(75) Inventor: Yuki Fujita, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 621 days.

(21) Appl. No.: 12/248,675

(22) Filed: Oct. 9, 2008

(65) Prior Publication Data

US 2009/0246097 A1    Oct. 1, 2009

(30) Foreign Application Priority Data

Mar. 27, 2008  (WO) .................. PCT/JP2008/055980

(51) Int. Cl.
*B01D 50/00*     (2006.01)
(52) U.S. Cl. ...................................... 422/180
(58) Field of Classification Search .................. 422/177, 422/180
See application file for complete search history.

(56) References Cited

U.S. PATENT DOCUMENTS

| | | |
|---|---|---|
| 2004/0128991 A1 | 7/2004 | Sakamoto |
| 2004/0166035 A1* | 8/2004 | Noda et al. ................... 422/180 |
| 2004/0211164 A1 | 10/2004 | Hamanaka et al. |
| 2006/0292336 A1 | 12/2006 | Ohno et al. |
| 2006/0292342 A1* | 12/2006 | Ohno et al. ................... 428/116 |
| 2007/0093692 A1* | 4/2007 | Leroy et al. ................... 600/182 |
| 2007/0212517 A1 | 9/2007 | Ohno et al. |
| 2007/0259770 A1 | 11/2007 | Hofmann et al. |
| 2008/0118701 A1 | 5/2008 | Ohno et al. |
| 2008/0119355 A1 | 5/2008 | Ohno et al. |
| 2008/0176028 A1 | 7/2008 | Ohno et al. |
| 2008/0187713 A1 | 8/2008 | Ohno et al. |
| 2008/0241003 A1 | 10/2008 | Ido et al. |
| 2008/0241005 A1 | 10/2008 | Ido et al. |
| 2008/0241008 A1 | 10/2008 | Ido et al. |
| 2008/0260991 A1 | 10/2008 | Konstandopoulos et al. |

FOREIGN PATENT DOCUMENTS

| | | |
|---|---|---|
| CN | 1883791 | 12/2006 |
| EP | 1 413 345 | 4/2004 |
| EP | 1 486 242 | 12/2004 |
| EP | 1 736 220 | 12/2006 |

(Continued)

OTHER PUBLICATIONS

Chinese Office Action for corresponding CN Application No. 200910127599.4, Oct. 12, 2010.

(Continued)

*Primary Examiner* — Tom Duong
(74) *Attorney, Agent, or Firm* — Ditthavong Mori & Steiner, P.C.

(57) ABSTRACT

A honeycomb structure includes four honeycomb units each including inorganic particles, an inorganic binder, and cell walls extending from a first end face to a second end face along a longitudinal direction to define a plurality of cells. The cell walls includes a first cell walls extending along a first direction in a cross sectional plane perpendicular to the longitudinal direction and a second cell walls extending along a second direction substantially perpendicular to the first direction in the cross sectional plane. Adhesive layers are provided between the four honeycomb units to connect the four honeycomb units. The adhesive layers extend in a first extending direction and a second extending direction substantially perpendicular to the first extending direction in the cross sectional plane. A minimum angle between the first direction and the first extending direction or the second extending direction is approximately 22.5 degrees to approximately 45 degrees.

38 Claims, 8 Drawing Sheets

FOREIGN PATENT DOCUMENTS

| | | |
|---|---|---|
| JP | 2001-190916 | 7/2001 |
| JP | 2003-227327 | 8/2003 |
| JP | 2006-223983 | 8/2006 |
| JP | 2007-229699 | 9/2007 |
| JP | 2007-229700 | 9/2007 |
| JP | 2007-296521 | 11/2007 |
| WO | 95/29326 | 11/1995 |
| WO | WO 2005/063653 | 7/2005 |

OTHER PUBLICATIONS

Chinese Office Action for corresponding CN Application No. 200910127599.4, May 20, 2011.

* cited by examiner

MINIMUM ANGLE BETWEEN FIRST DIRECTION OF CELL WALLS
AND EXTENDING DIRECTIONS OF ADHESIVE LAYERS (°)

HONEYCOMB STRUCTURE AND EXHAUST GAS TREATING APPARATUS

CROSS-REFERENCE TO RELATED APPLICATION

The present application claims priority under 35 U.S.C. §119 to PCT International Application No. PCT/JP2008/055980, filed on Mar. 27, 2008, the entire contents of which are hereby incorporated herein by reference.

BACKGROUND OF THE INVENTION

1. Field of the Invention

The present invention relates to a honeycomb structure and an exhaust gas treating apparatus.

2. Description of the Related Art

Conventionally, a honeycomb structure is used in an exhaust gas treating apparatus which treats HC, CO, NOx, SOx, and the like including in automotive exhaust gases. The honeycomb structure has plural cells (through holes) which extend from one end face to the other end face of the honeycomb structure along the long length direction of the honeycomb structure, and the cells are separated from each other by walls of the cells (cell walls).

A catalyst such as platinum is provided on the cell walls of the honeycomb structure. When exhaust gases flow into a catalyst carrier (honeycomb structure) providing the catalyst, the catalyst on the cell walls can treat components of HC, CO, NOx, Sox, and the like in the exhaust gases by catalytic reaction. WO2005/063653A discloses a honeycomb structure which includes a first inorganic material (for example, ceramic particles), and a second inorganic material (for example, inorganic fibers, inorganic particles having a relatively large diameter, and an inorganic binder).

In addition, JPA 2001-190916 discloses a honeycomb structure which is used as a DPF (diesel particulate filter). In the honeycomb structure, first, a predetermined number of honeycomb units are bonded by adhering side faces of the honeycomb units having the same pillar shape by interposing adhesive layers, and the peripheral surface of the bonded honeycomb units is cut so that a honeycomb structure having a desirable shape is formed. Further, JPA 2006-223983 discloses a honeycomb structure.

In the honeycomb structure, first, honeycomb units having corresponding predetermined shapes are formed, and a honeycomb structure having a desirable shape is formed by combining the honeycomb units by interposing adhesive layers without a cutting process. In JPA 2006-223983, the honeycomb structure is formed by combining 16 honeycomb units of three different shapes.

The entire contents of WO2005/063653A, JPA 2001-190916, and JPA 2006-223983 are hereby incorporated by reference.

SUMMARY OF THE INVENTION

A honeycomb structure includes four honeycomb units each including inorganic particles, an inorganic binder, and cell walls extending from a first end face to a second end face along a longitudinal direction of the honeycomb structure to define a plurality of cells. The cell walls includes a first cell walls extending along a first direction in a cross sectional plane perpendicular to the longitudinal direction and a second cell walls extending along a second direction substantially perpendicular to the first direction in the cross sectional plane. Adhesive layers are provided between the four honeycomb units to connect the four honeycomb units. The adhesive layers extend in a first extending direction and a second extending direction substantially perpendicular to the first extending direction in the cross sectional plane. A minimum angle between the first direction and the first extending direction or the second extending direction is approximately 22.5 degrees to approximately 45 degrees.

An exhaust gas treating apparatus includes a honeycomb structure having a longitudinal direction, a metal casing containing the honeycomb structure, and a holding sealing member disposed between the honeycomb structure and the metal casing to hold the honeycomb structure at a predetermined position in the metal casing. The honeycomb structure includes a first end face, a second end face opposite to the first end face along the longitudinal direction, and four honeycomb units. Each of the honeycomb units includes inorganic particles, an inorganic binder, and a plurality of cell walls extending from the first end face to the second end face to define a plurality of cells. The plurality of cell walls include a first cell walls extending along a first direction in a cross sectional plane perpendicular to the longitudinal direction and a second cell walls extending along a second direction substantially perpendicular to the first direction in the cross sectional plane. Adhesive layers are provided between the four honeycomb units to connect the four honeycomb units each other. The adhesive layers extend in a first extending direction and a second extending direction substantially perpendicular to the first extending direction in the cross sectional plane. A minimum angle between the first direction and the first extending direction or the second extending direction is approximately 22.5 degrees to approximately 45 degrees.

BRIEF DESCRIPTION OF THE DRAWINGS

Features and advantages of the present invention will become apparent from the following detailed description when read in conjunction with the accompanying drawings.

DETAILED DESCRIPTION OF THE PREFERRED EMBODIMENT

Figure 1:
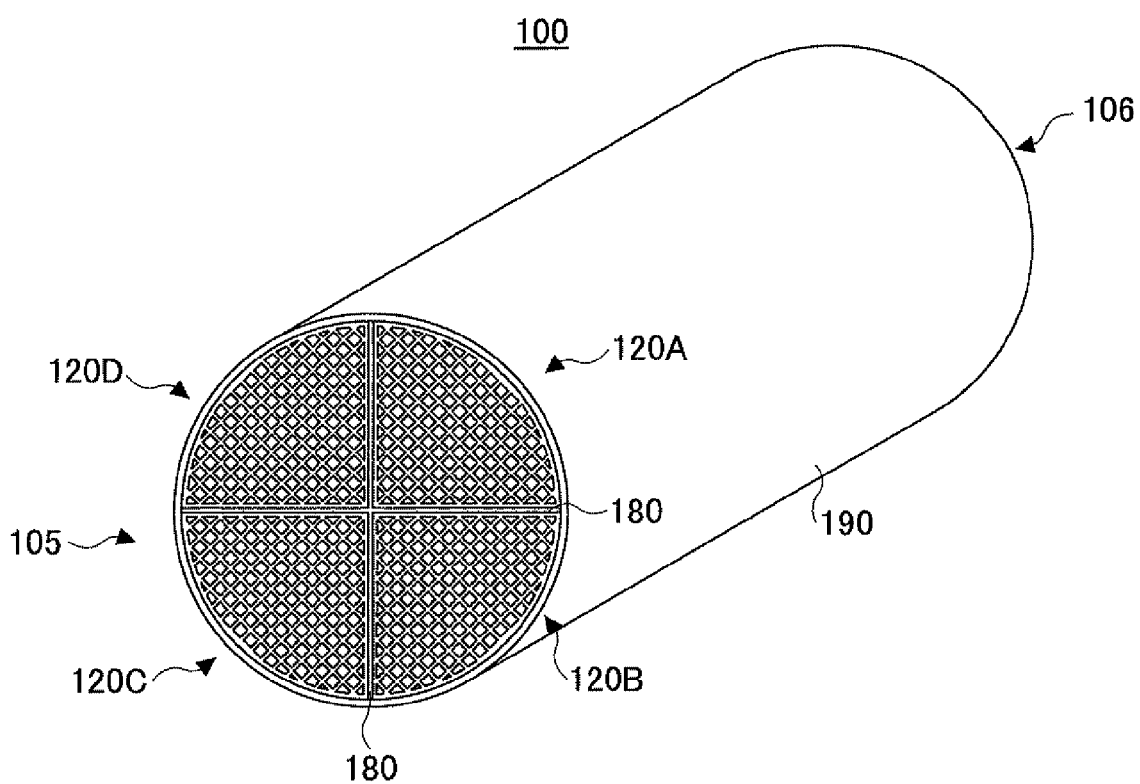
FIG. 1 is a perspective view of a honeycomb structure according to an embodiment of the present invention.

Referring now to the drawings, an embodiment of the present invention is described.

Figure 2:
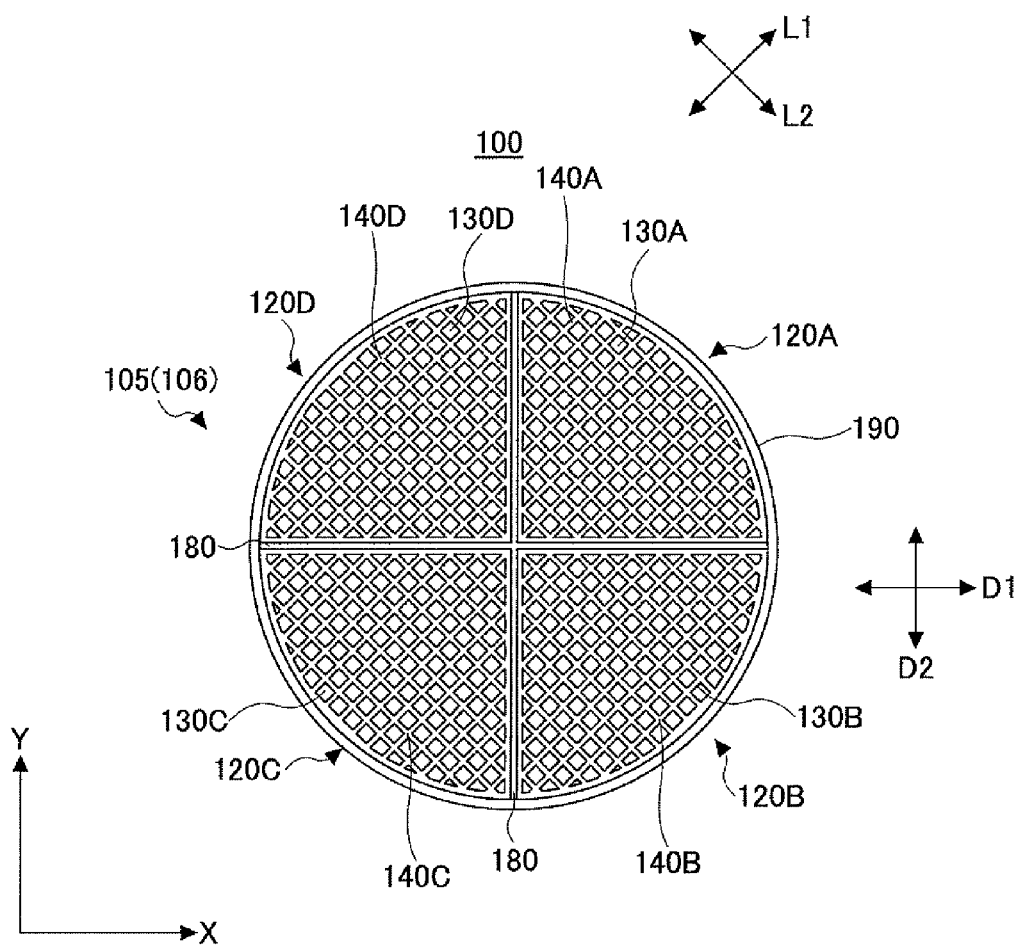
FIG. 2 is an enlarged view of a cross section orthogonal to the long length direction of the honeycomb structure shown in FIG. 1.
Figure 3:
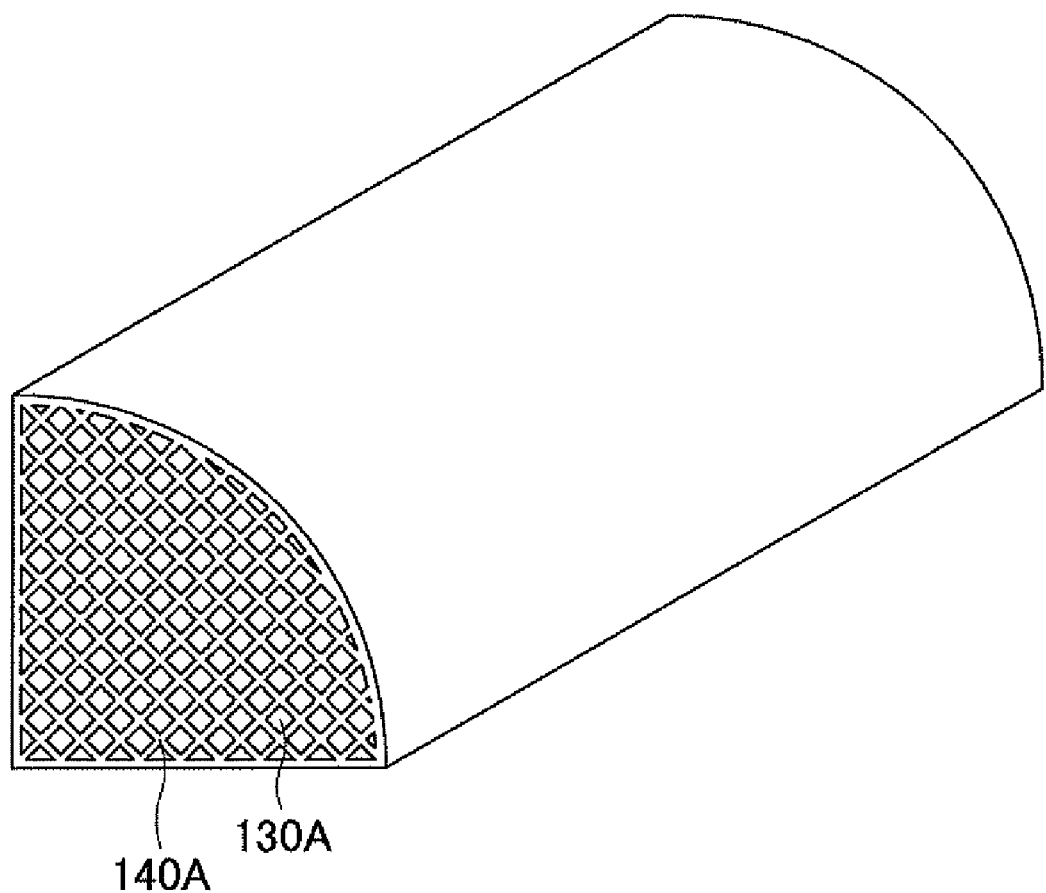
FIG. 3 is an enlarged perspective view of a honeycomb unit shown in FIG. 1.

FIG. 1 is a perspective view of a honeycomb structure 100 according to an embodiment of the present invention. FIG. 2 is an enlarged view of a cross section orthogonal to the long length direction of the honeycomb structure 100 shown in FIG. 1. FIG. 3 is an enlarged perspective view of a honeycomb unit 120A of the honeycomb structure 100 according to the embodiment of the present invention.

As shown in FIG. 1, the honeycomb structure 100 according to the embodiment of the present invention includes a first end face 105, a second end face 106, four honeycomb units 120A through 120D, and adhesive layers 180 which adhere the four honeycomb units 120A through 120D each other.

Each of the four honeycomb units 120A through 120D substantially has the same structure and the same shape. Therefore, in the following, in some cases, the honeycomb unit 120A is described in detail as a representative of the four honeycomb units 120A through 120D.

A coating layer 190 shown in FIGS. 1 and 2 is described below in detail.

As shown in FIG. 3, the honeycomb unit 120A has a ¼ pillar shape whose cross section is approximately fan-shaped. The honeycomb unit 120A includes many cells (through holes) 130A separated by cell walls 140A disposed along the long length direction of the honeycomb unit 120A. The cross section of the cell 130A orthogonal to the long length direction of the honeycomb unit 120A is approximately square-shaped.

As shown in FIGS. 1 and 2, the adhesive layers 180 are extended in corresponding two directions orthogonal to each other. Hereinafter the two directions are referred to as a first extending direction D1 (X axis direction in FIG. 2) and a second extending direction D2 (Y axis direction in FIG. 2).

In FIG. 2, when the honeycomb structure 100 is viewed from the first end face 105 side (or the second end face 106 side), the cell walls 140A are formed to have a lattice configuration so that center lines of the cell walls 140A are extended in corresponding two directions (first direction L1 and second direction L2) substantially orthogonal to each other. In this, the names of "first" and "second" are arbitrarily determined, and one of the two directions is the first direction and the other of the two directions is the second direction. In FIG. 2, the first direction L1 is the direction in which the X axis (horizontal axis) is rotated counterclockwise 45 degrees, and the second direction L2 is the direction in which the X axis (horizontal axis) is rotated clockwise 45 degrees.

In addition, as shown in FIG. 2, in the honeycomb unit 120A, the first direction L1 (or the second direction L2) of the cell walls 140A has a "minimum angle" of 45 degrees relative to the first and second extending directions of the adhesive layers 180.

Figure 4A:
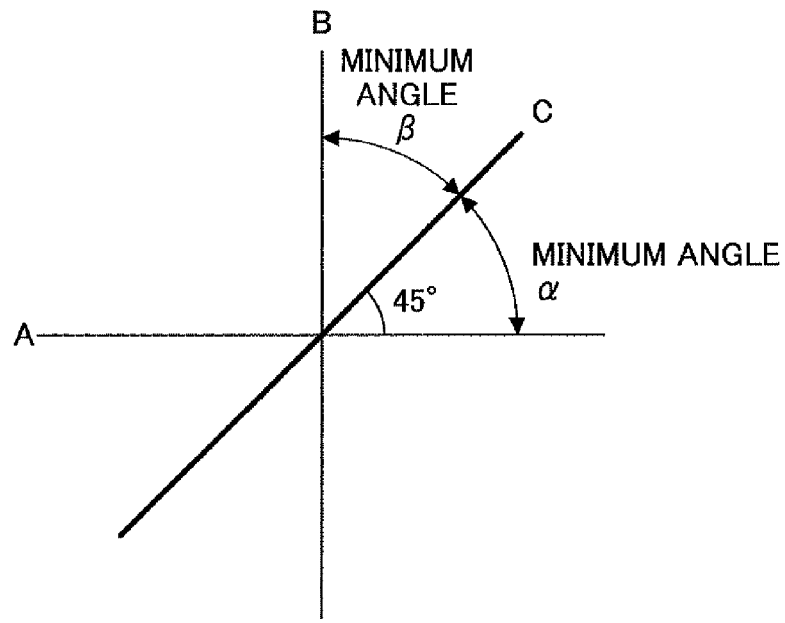
FIGS. 4A and 4B are diagrams showing the concept of a minimum angle according to the embodiment of the present invention.
Figure 4B:
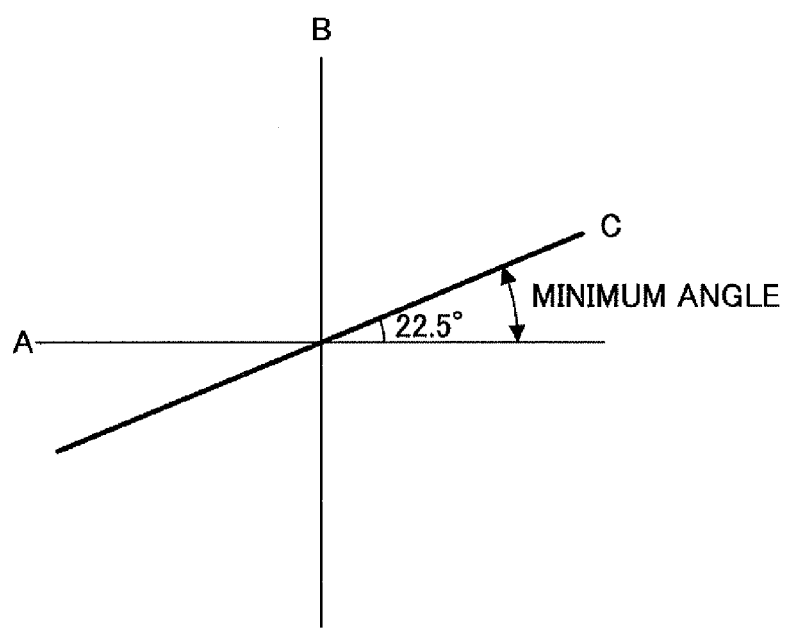

In this, the "minimum angle" signifies a minimum angle between one group of straight lines and a third straight line. FIGS. 4A and 4B are diagrams showing the concept of the minimum angle. For example, in FIG. 4A, when a group of straight lines A and B orthogonal to each other and a third straight line C rotated counterclockwise 45 degrees relative to the straight line A exist, the angle between straight lines A and C is 45 degrees or 135 degrees. In this case, the minimum angle between the group of the straight lines A and B and the third straight line C is 45 degrees shown by α or β. Therefore, the minimum angle between the group of the straight lines and the straight line C is 45 degrees.

In addition, for example, in FIG. 4B, when the third straight line C is rotated counterclockwise 22.5 degrees relative to the straight line A, the angle between the straight lines A and C is 22.5 degrees or 157.5 degrees, and the angle between straight lines B and C is 67.5 degrees or 112.5 degrees. In this case, the minimum angle between the group of the straight lines A and B and the third straight line C is 22.5 degrees. Therefore, the minimum angle between the group of the straight lines and the third straight line C is 22.5 degrees.

In FIG. 2, in the honeycomb structure 100, the angle between the first direction L1 (or the second direction L2) of the cell walls 140A and the first and second extending directions D1 and D2 of the adhesive layers 180 is formed to be the minimum angle of 45 degrees. However, the angle between the first direction L1 (or the second direction L2) of the cell walls 140A and the first and second extending directions D1 and D2 of the adhesive layers 180 is not limited to 45 degrees; it is desirably in a range approximately 22.5 to approximately 45 degrees.

Next, effects of the honeycomb structure 100 according to the embodiment of the present invention are described by comparison with a conventional honeycomb structure 200.

However, the honeycomb structure in WO2005/063653A has a problem that it is weak against external stress. Even if the honeycomb structure of WO2005/063653A uses the adhesive layer described in JPA 2001-190916, since the cell walls are formed in parallel with the adhesive layer, the honeycomb structure is easily broken by relatively low stress from the outside.

In JPA 2006-223983, the honeycomb structure is formed by bonding the 16 honeycomb units. In order to make the strength high against external stress, as the honeycomb structure is viewed from the end face of the honeycomb structure, in the minimum size honeycomb units at four corners of the honeycomb structure, the cell disposing direction is rotated 45 degrees relative to the cells of the other honeycomb units.

However, in the honeycomb structure of JPA 2006-223983, almost all the stresses rotated 45 degrees from the bonding direction of the honeycomb units are directly applied on the minimum size honeycomb units at the four corners, of the stresses applied onto the peripheral surface of the honeycomb structure from the outside. Therefore, the minimum size honeycomb units at the four corners are easily broken even if a relatively low stress is applied onto the peripheral surface of the honeycomb structure. That is, the strength of the honeycomb structure may not be enough.

Figure 5:
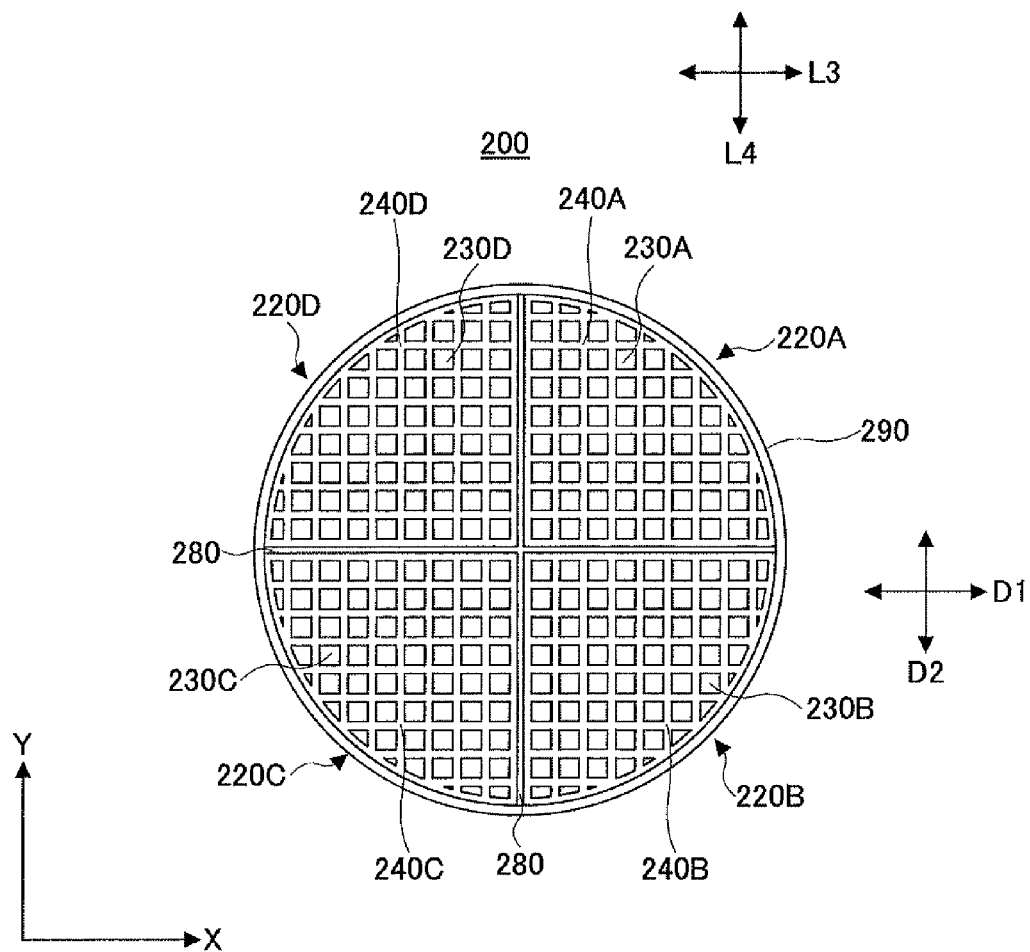
FIG. 5 is an enlarged view of a cross section orthogonal to the long length direction of a conventional honeycomb structure.

FIG. 5 is an enlarged view of a cross section orthogonal to the long length direction of a conventional honeycomb structure 200.

The conventional honeycomb structure 200 includes four honeycomb units 220A through 220D and adhesive layers 280. The adhesive layers 280 adhere the four honeycomb units 220A through 220D each other. The adhesive layers 280 are extended in the corresponding two extending directions D1 (X axis direction) and D2 (Y axis direction) orthogonal to each other. In the conventional honeycomb structure 200, each of the four honeycomb units 220A through 220D has substantially the same structure and the same shape. Therefore, the honeycomb unit 220A is described in detail as a representative of the four honeycomb units 220A through 220D. As shown in FIG. 5, when the conventional honeycomb structure 200 is viewed from one end face side of the conventional honeycomb structure 200, a first direction L3 (or a second direction L4) of the cell walls 240A of the honeycomb unit 220A is substantially the same as the first extending direction D1 (or the second extending direction D2) of the adhesive layer 280. That is, the first direction L3 of the cell walls 240A is substantially the same as the first extending direction D1 of the adhesive layer 280, and the second direction L4 of the cell walls 240A is substantially the same as the second extending direction D2 of the adhesive layer 280.

When stress (compressive stress) is applied onto a peripheral surface of the conventional honeycomb structure 200 from the outside, strength characteristics are different among positions on the peripheral surface to which positions the stress is applied. In addition, a coating layer 290 is formed on the peripheral surface of the honeycomb structure 200 so as to increase the strength against stress from the outside.

Figure 6:
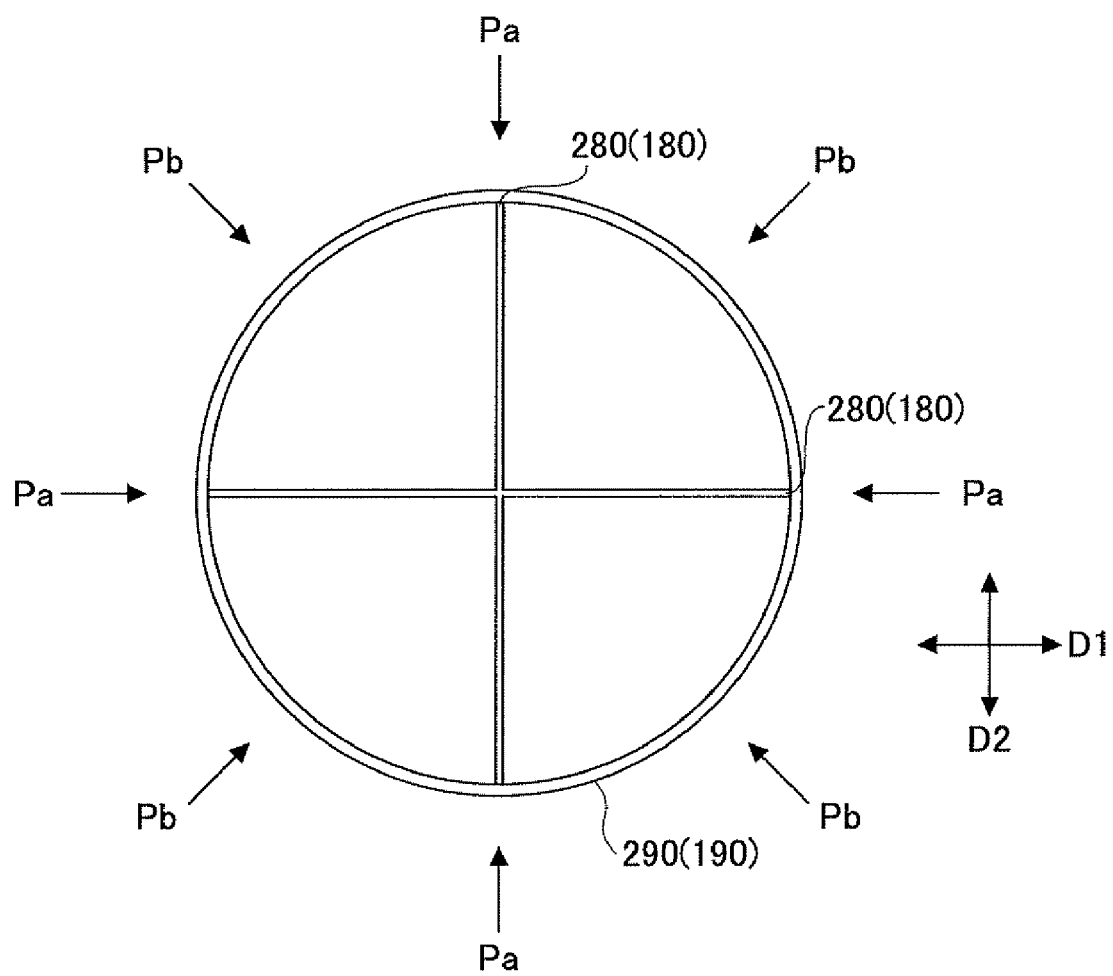
FIG. 6 is a schematic diagram showing stresses being applied onto corresponding peripheral surfaces of the conventional honeycomb structure shown in FIG. 5 and the honeycomb structure according to the embodiment of the present invention.

FIG. 6 is a schematic diagram showing stresses being applied onto the corresponding peripheral surfaces of the honeycomb structures 200 and 100. For example, in FIG. 6, when stresses Pa are applied to the conventional honeycomb structure 200 from the first and second extending directions D1 and D2 of the adhesive layers 280, since the adhesive layers 280 function as reinforcing members, the strength against the external stress is high. However, when stresses Pb are applied to the conventional honeycomb structure 200 from directions shifted approximately 45 degrees from the first and second extending directions D1 and D2 of the adhesive layers 280, the strength against the external stress is low.

As shown in FIG. 5, the first direction L3 of the cell walls 240A is substantially parallel to the first extending direction D1 of the adhesive layer 280, and the second direction L4 of the cell walls 240A is substantially parallel to the second extending direction D2 of the adhesive layer 280. Consequently, the adhesive layers 280 can function as reinforcing members against the stresses Pa; however, it is conceivable that the adhesive layers 280 do not function as the reinforcing members against the stresses Pb.

When a honeycomb structure has at least one weak portion on the peripheral surface of the honeycomb structure, the honeycomb structure is easily broken at the weak portion. Consequently, it is conceivable that the conventional honeycomb structure 200 is broken when one of the stresses Pb is applied onto the peripheral surface of the honeycomb structure 200.

In order to solve the above problem, the strength of the honeycomb structure must be high against stress from the outside. That is, it is conceivable that the weak portion of the honeycomb structure must be reinforced.

In the honeycomb structure 100 according to the embodiment of the present invention, as described above, the angle between the first direction L1 (or the second direction L2) of the cell walls 140A and the first and second extending directions D1 and D2 of the adhesive layers 180 is formed to be the minimum angle 22.5 to 45 degrees. Therefore, the honeycomb structure 100 has almost uniform strength on the peripheral surface against stress from the outside.

Returning to FIGS. 2 and 6, when stresses Pa are applied to the honeycomb structure 100 from the first and second extending directions D1 and D2 of the adhesive layers 180, since the adhesive layers 180 function as reinforcing members, the strength against the external stress is high. In addition, when stresses Pb are applied to the honeycomb structure 100 from directions shifted approximately 45 degrees from the first and second extending directions D1 and D2 of the adhesive layers 180, since the cell walls 140A of the honeycomb structure 120A function as reinforcing members, the strength against the external stress is high. That is, as shown in FIG. 2, the first direction L1 or the second direction L2 of the cell walls 140A through 140D are almost the same as the direction of the stress Pb. Therefore, the honeycomb structure 100 according to the embodiment of the present invention has substantially uniform strength against stresses from the outside. Consequently, it is conceivable that the honeycomb structure 100 has greater strength than the conventional honeycomb structure 200 against the stresses from the outside.

As described above, in the honeycomb structure of JPA 2006-223983, in order to make the strength high against the stresses from the outside, when the honeycomb structure is viewed from one end face side in the long length direction of the honeycomb structure, only in the minimum size honeycomb units at the corresponding four corners, the arranging direction of cells is rotated by 45 degrees relative to the arranging direction of cells in the adjacent honeycomb units.

In JPA 2006-223983, when the conventional honeycomb structure is formed and is used in the embodiment of the present invention, the 16 honeycomb units of three different shapes are adhered by interposing adhesive layers by accurately positioning the 16 honeycomb units. This manufacturing process is very difficult. Actually, the positions of the 16 honeycomb units may be slightly shifted and the shape of the manufactured honeycomb structure may be different from a desirable predetermined shape.

In addition, in the honeycomb structure having the minimum size honeycomb units at the corresponding four corners, it is conceivable that the flow of the exhaust gasses is not uniform. When the honeycomb structure is used as a DPF, since the exhaust gasses flow through the walls (wall flow type), it is conceivable that the honeycomb structure is effectively used. However, when the honeycomb structure is used as a catalyst carrier, since this honeycomb structure is used as a straight flow type (exhaust gases flow through the cells), this honeycomb structure cannot be effectively used. Consequently efficiency for treating (converting) components of HC, CO, NOx, Sox, and the like from the exhaust gasses may be lowered.

In the honeycomb structure 100 according to the embodiment of the present invention, the four honeycomb units 120A through 120D are adhered by interposing the adhesive layers 180. Therefore, the number of the adhering members (the adhesive layers 180) is small and the position shift among the four honeycomb units 120A through 120D can be likely to be lowered. In addition, after manufacturing the honeycomb structure 100, the directions of the cell walls 140A through 140D of the corresponding honeycomb units 120A through 120D are substantially the same as the first direction L1 or the second direction L2. In the honeycomb structure 100 according to the embodiment of the present invention, the flow of the exhaust gasses is hardly non-uniform and the efficiency for treating (converting) the components of HC, CO, NOx, Sox, and the like from the exhaust gasses is hardly lowered.

Figure 7:
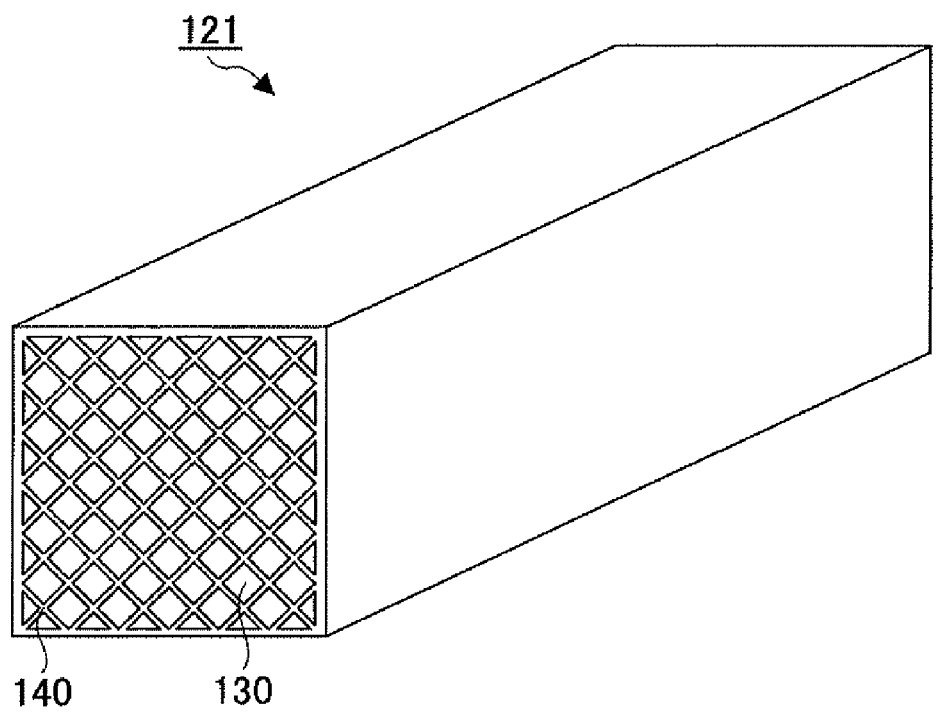
FIG. 7 is a perspective view of a honeycomb unit in another example according to the embodiment of the present invention.
Figure 7:
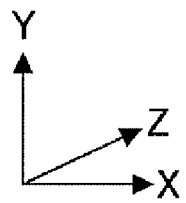

In the above, the honeycomb structure 100 having a desirable peripheral shape is directly formed by adhering the four honeycomb units 120A through 120D each of whose cross section is fan-shaped along the long length direction of the honeycomb units 120A through 120D by interposing the adhesive layers 180. However, the shape and the manufacturing method of a honeycomb structure are not limited to the above. FIG. 7 is a perspective view of a honeycomb unit 121 in another example according to the embodiment of the present invention. That is, when the four honeycomb units 121 having a square pillar shape are adhered by interposing adhesive layers (not shown) and the adhered four honeycomb units 121 are cut to form a desirable peripheral shape, a honeycomb structure having the desirable peripheral shape can be formed.

In addition, as shown in FIG. 1, the honeycomb structure 100 has a cylindrical shape whose cross section is approximately circle-shaped. However, the shape of the cross section of the honeycomb structure according to the embodiment of the present invention can be an arbitrarily shape, for example, an elliptical shape, an oval shape, or the like.

The honeycomb structure 100 is assumed to be used as a catalyst carrier. When the honeycomb structure 100 according to the embodiment of the present invention is used to treat (convert) predetermined components such as HC, CO, NOx, Sox, and the like from automotive exhaust gases, a catalyst, for example, alkali metal, alkali earth metal, or the like can be supported on the cell walls 140A through 140D so as to accelerate the treatment (conversion) of the above components. In addition, a catalyst can be contained in a base material of the honeycomb structure 100.

As described above, the honeycomb structure 100 according to the embodiment of the present invention can be used in an automotive exhaust gas treating apparatus.

Figure 8:
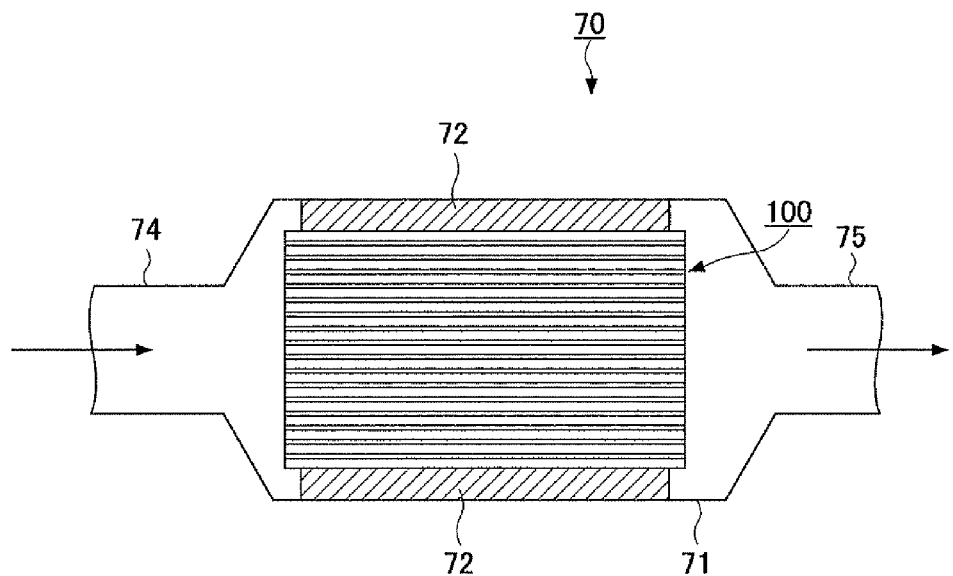
FIG. 8 is a schematic diagram showing an exhaust gas treating apparatus using the honeycomb structure according to the embodiment of the present invention.

FIG. 8 is a schematic diagram showing an exhaust gas treating apparatus 70 using the honeycomb structure 100 according to the embodiment of the present invention. As shown in FIG. 8, the automotive exhaust gas treating apparatus 70 includes the honeycomb structure 100, a metal casing 71 for containing the honeycomb structure 100, and a holding sealing member 72 for holding the honeycomb structure 100 at a predetermined position in the metal casing 71. In addition, an introducing pipe 74 is connected to one end (introducing section) of the automotive exhaust gas treating apparatus 70 to which introducing pipe 74 exhaust gases emitted from an internal combustion device such as an engine are introduced, and an emitting pipe 75 is connected to the other end (emitting section) of the automotive exhaust gas treating apparatus 70 from which emitting pipe 75 the exhaust gases treated by the automotive exhaust gas treating apparatus 70 are emitted. In FIG. 8, the arrows show the flow of the exhaust gases.

The exhaust gases emitted from the internal combustion device such as the engine are introduced to the metal casing 71 via the introducing pipe 74, and the introduced exhaust gases flow into the cells of the honeycomb structure 100 via one end face (for example, a first end face) of the honeycomb structure 100 which end face faces the introducing pipe 74. The exhaust gases flowing into the cells are emitted from the emitting pipe 75 to the outside. With this process, toxic substances in the exhaust gases are treated (converted).

In the honeycomb structure and the exhaust gas treating apparatus using the honeycomb structure according to the embodiment of the present invention, the honeycomb structure has higher strength against stress applied onto a peripheral surface of the honeycomb structure from the outside than a conventional honeycomb structure and is hardly provide a crack.

In the following, when a suffix is not attached to a reference number of an element, the reference number represents the set of elements. For example, a honeycomb unit 120 represents the honeycomb units 120A through 120D.

In the embodiment of the present invention, it is preferable that the cell density of the honeycomb unit 120 be approximately 15.5 to approximately 186 pieces per cm$^2$ (approximately 100 to approximately 1200 cpsi; cells per square inch), more preferably, approximately 46.5 to approximately 170 pieces per cm$^2$ (approximately 200 to approximately 1000 cpsi), and still more preferably, approximately 62.0 to approximately 155 pieces per cm$^2$ (approximately 300 to approximately 800 cpsi).

The thickness of the cell walls 140 of the honeycomb unit 120 is not particularly limited. However, in order to obtain sufficient strength, in the thickness of the cell walls 140, the preferable lower limit is approximately 0.1 mm and the preferable upper limit is approximately 0.4 mm.

The specific surface area of the honeycomb unit 120 is not particularly limited; however, the specific surface area is preferably in a range of approximately 25000 m$^2$/L to approximately 70000 m$^2$/L.

The material of the honeycomb unit 120 of the honeycomb structure 100 according to the embodiment of the present invention is not particularly limited; however, the material preferably includes inorganic particles and an inorganic binder, and can further include inorganic fibers.

The inorganic particles are preferably particles of such as alumina, ceria, zirconia, titania, silica, zeolite, mullite, and the like. However, as the inorganic particles, one of the above particles can be used solely, or the above two or more particles can be used.

When zeolite is used as the inorganic particles, ion-exchanged zeolite by using Cu, Fe, Ni, Zn, Mn, or Co can be used. The sole ion-exchanged zeolite can be used. However, two or more ion-exchanged zeolite can be combined, or ion-exchanged zeolite can be used in which metals whose valence is different from each other are combined.

The material of the inorganic fibers is preferably alumina, silica, silicon carbide, silica-alumina, glass, potassium titanate, aluminum borate, or the like. As the inorganic fibers, the material can be used solely, or two or more above materials are combined. However, the material of the inorganic fibers is more preferably alumina.

In the embodiment of the present invention, the average aspect ratio (length/diameter) of the inorganic fibers is more than approximately 5. The aspect ratio is preferably approximately 10 to approximately 1000.

As the inorganic binder, inorganic sol, a clay based binder, or the like can be used. The inorganic sol is, for example, alumina sol, silica sol, titania sol, liquid glass, or the like. The clay based binder is multiple chain type clay, or the like, for example, white clay, kaolin, montmorillonite, meerschaum, attapulgite, or the like. In addition, as the inorganic binder, one of the above material can be used solely, or two or more of the above materials can be combined.

The inorganic binder preferably includes one of alumina sol, silica sol, titania sol, liquid glass, meerschaum, and attapulgite.

The lower limit of the amount of the inorganic particles contained in the honeycomb unit 120 is preferably approximately 30 wt %, more preferably, approximately 40 wt %, and still more preferably, approximately 50 wt %. The upper limit of the amount of the inorganic particles containing in the honeycomb unit 120 is preferably approximately 90 wt %, more preferably, approximately 80 wt %, and still more preferably, approximately 75 wt %.

When the contained amount of the inorganic particles in the honeycomb unit 120 is approximately 30 wt % or more, the amount of the inorganic particles contributing to the catalytic action is hardly small relatively. When the contained amount of the inorganic particles in the honeycomb unit 120 is approximately 90 wt % or less, the amount of the inorganic fibers contributing to increase the strength of the honeycomb unit 120 becomes relatively small, and the strength of the honeycomb unit 120 is hardly lowered.

The lower limit of the amount of the inorganic fibers in the honeycomb unit 120 is preferably, approximately 3 wt %, more preferably, approximately 5 wt %, and still more preferably, approximately 8 wt %. The upper limit of the amount of the inorganic fibers in the honeycomb unit 120 is preferably, approximately 50 wt %, more preferably, approximately 40 wt %, and still more preferably, approximately 30 wt %.

When the contained amount of the inorganic fibers in the honeycomb unit 120 is approximately 3 wt % or more, the strength of the honeycomb unit 120 is hardly lowered, and when the contained amount of the inorganic fibers in the honeycomb unit 120 is approximately 50 wt % or less, the amount of the inorganic particles contributing to the catalytic action is hardly small relatively. For example, when the contained amount of the inorganic fibers in the honeycomb unit 120 is approximately 50 wt % or less, the specific surface area of the honeycomb structure 100 becomes small, catalyst components can be likely dispersed when the catalyst components are supported, and further, the catalyst amount per unit volume is hardly lowered.

The lower limit of the amount of the inorganic binder as solids content containing in the raw materials is preferably, approximately 5 wt % per total amount of the inorganic particles, the inorganic fibers, and the solids content of the inorganic binder, more preferably, approximately 10 wt %, and still more preferably, approximately 15 wt %. The upper limit of the amount of the inorganic binder as solids content is preferably, approximately 50 wt %, more preferably, approximately 40 wt %, and still more preferably, approximately 35 wt %.

When the contained amount of the inorganic binder as solids content is approximately 5 wt % or more, the strength of the honeycomb unit 120 is hardly lowered, and when the contained amount of the inorganic binder as solids content is approximately 50 wt % or less, molding ability of the raw materials is hardly lowered.

The adhesive layer 180 of the honeycomb structure 100 according to the embodiment of the present invention can be formed of a dense substance or a porous substance. The material of the adhesive layer 180 can include, for example, an inorganic binder, an organic binder, inorganic fibers, and/or inorganic particles.

As the substance of the inorganic binder for the adhesive layer 180, a substance containing silica sol, alumina sol, titania sol, or the like can be used. However, as the inorganic binder, one of the above substances can be used solely, or two or more of the above substances can be combined.

As the substance of the organic binder for the adhesive layer 180, polyvinyl alcohol, methylcellulose, ethylcellulose, carboxymethyl cellulose, or the like can be used. However, as the organic binder, one of the above substances can be used solely, or two or more of the above substances can be combined.

As the substance of the inorganic fibers for the adhesive layer 180, ceramic fibers including, for example, silica-alumina, mullite, alumina, silica, or the like can be used. However, as the inorganic fibers, one of the above substances can be used solely, or two or more of the above substances can be combined.

As the inorganic particles for the adhesive layer 180, the same inorganic particles as that of the material for the honeycomb unit 120 can be used. However, the inorganic particles can be used solely, or two or more of the above inorganic particles for the raw material can be used.

In order to form the adhesive layer 180, first, a paste is prepared by including the above substances, the paste is adhered onto a predetermined position, and the paste is dried. With this, the adhesive layers 180 are formed. Pore forming agents such as balloons (minute hollow balls) formed of oxide based ceramics, spherical acrylic particles, and graphite can be added to the paste as the raw material.

The honeycomb structure 100 can further dispose the coating layer 190 (see FIG. 1) on the peripheral surface of the honeycomb structure 100. When the coating layer 190 is formed, the strength of the peripheral surface of the honeycomb structure 100 can be further increased.

The thickness of the coating layer 190 is preferably in a range of approximately 0.2 to approximately 3.0 mm. The material of the coating layer 190 can be the same as that of the adhesive layer 180 or different from that of the adhesive layer 180.

[Manufacturing Method of Honeycomb Structure]

Next, a manufacturing method of the honeycomb structure 100 according to the embodiment of the present invention is described. First, a raw material paste whose base components are ceramic particles, inorganic fibers, and an inorganic binder is prepared, and a honeycomb unit molded body is formed of the raw material paste by using extrusion molding or the like. An organic binder, a dispersion medium, and/or a molding aid can be added to the raw material paste so as to obtain high molding ability.

The organic binder is not particularly limited, as the organic binder, there are, for example, methylcellulose, carboxymethyl cellulose, hydroxylethyl cellulose, polyethyleneglycole, phenol resin, epoxy resin, and the like. One of more of the above organic binders can be selected. When the organic binder is added into the original raw material paste, the adding ratio of the organic binder to the original raw material paste (total amount of the ceramic particles, the inorganic fibers, and the inorganic binders) is preferable 1 to 10 wt % to 100 wt %.

The dispersion medium is not particularly limited. As the dispersion medium, there are, for example, water, organic solvent (for example, benzene), alcohol (for example, methanol), and the like. The molding aid is not particularly limited. As the molding aid, there are, for example, ethylene glycol, dextrin, fatty acid, fatty acid soap, polyalcohol, and the like.

The raw material paste is preferably mixed and kneaded. The raw material paste can be sufficiently mixed by a mixer, an attritor (grinding mill), and the like, and can be sufficiently kneaded by a kneader or the like. The forming method of the raw material paste is not particularly limited, and there is, for example, an extrusion method or the like. The honeycomb unit molded body is formed to have cells (see FIG. 3).

The honeycomb unit molded body is preferably dried by, for example, a drying apparatus. The drying apparatus is not particularly limited. As the drying apparatus, there are, for example, a microwave drying apparatus, a hot air drying apparatus, a dielectric drying apparatus, a reduced pressure drying apparatus, a vacuum drying apparatus, a freeze drying apparatus, and the like. The dried honeycomb unit molded body is preferably degreased. The degreasing conditions are determined depending on the amount and kind of organic substances contained in the honeycomb unit molded body; however, the honeycomb unit molded body is degreased under the conditions of at approximately 400° C. for approximately 2 hours. Further, the degreased honeycomb unit molded body is preferably subjected to firing. The firing condition is preferably at approximately 600 to approximately 1200° C. for approximately 2 hours, more preferably at approximately 600 to approximately 1000° C. for approximately 2 hours. When the firing temperature is approximately 600° C. or more, the sintering is likely progressed, and the strength of the honeycomb unit 120 is hardly low. When the firing temperature is approximately 1200° C. or less, since the sintering is not too progressed, the specific surface area per unit volume of the honeycomb unit 120 is hardly small. By the above processes, the honeycomb unit 120 having plural cells (through holes) is obtained.

Next, an adhesive layer paste which becomes the adhesive layers 180 is applied with a uniform thickness onto surfaces of the honeycomb unit 120 onto which surfaces other honeycomb units 120 are adhered. Then the four honeycomb units 120 are adhered to each other by interposing the corresponding adhesive layers 180. For example, two of the honeycomb units 120 are adhered in the vertical direction and the adhered two honeycomb units 120 are adhered in the horizontal direction. With this, the honeycomb structure 100 having a predetermined size is formed. As the adhesive layer paste, the raw material paste for the honeycomb unit 120 can be used.

The adhesive layer paste is not particularly limited. As the adhesive layer paste, a paste combining an inorganic binder with ceramic particles, a paste combining an inorganic binder with inorganic fibers, a paste combining an inorganic binder and ceramic particles with inorganic fibers, or the like can be used. In addition, an inorganic binder can be added to the above adhesive layer paste. The organic binder is not particularly limited. As the organic binder, there are, for example, polyvinyl alcohol, methylcellulose, ethylcellulose, carboxymethyl cellulose, and the like, and one or more the above organic binders can be selected.

The thickness of the adhesive layer 180 is preferably, approximately 0.3 to approximately 2.0 mm. When the thickness is approximately 0.3 mm or more, sufficient adhering strength is likely obtained. When the thickness is approximately 2.0 mm or less, since the adhesive layer 180 does not function as the catalyst carrier, the specific surface area per unit volume of the honeycomb structure 100 is hardly small and high dispersion of catalyst components is likely executed when the honeycomb structure 100 supports the catalyst components, and further, the conversion performance of the honeycomb structure 100 is hardly lowered by hardly decreasing the catalyst amount per unit volume of the honeycomb structure 100. In addition, when the thickness is approximately 2.0 mm or less, the pressure loss of gasses flowing into the honeycomb structure 100 is hardly increased.

Next, heat is applied to the honeycomb structure in which the four honeycomb units 120 are adhered by interposing the adhesive layers 180; with this, the adhesive layers 180 (adhesive layer pastes) are dried and solidified. That is, as shown in FIG. 1, the cylindrical honeycomb structure 100 having the four honeycomb units 120 shown in FIG. 3 is manufactured.

In addition, the coating layer 190 can be formed on the peripheral surface of the honeycomb structure 100. In this case, a coating layer paste is applied onto the peripheral surface of the honeycomb structure 100 and the coating layer paste is dried and solidified. With this, the coating layer 190 is formed. The coating layer paste is not particularly limited. As the coating layer paste, the adhesive layer paste or another paste can be used. The compounding ratios of substances of the coating layer paste can be the same as those of the adhesive layer paste or different from those of the adhesive layer paste. In addition, the thickness of the coating layer 190 is not particularly limited. However, the thickness of the coating layer 190 is preferably, approximately 0.2 to approximately 3.0 mm.

Heat treatment is preferably applied to the honeycomb structure 100 after the four honeycomb units 120 are adhered by interposing the adhesive layers 180 (and after the coating layer 190 is further formed). When the adhesive layer paste (and the coating layer paste) includes an organic binder, the adhesive layer paste (and the coating layer paste) can be degreased by heat treatment. The degreasing conditions depend on the amount and kind of the organic binder in the paste; however, the degreasing conditions are preferably at approximately 700° C. for approximately 2 hours.

The catalyst material to be supported on the cell walls 140 of the honeycomb structure 100 is noble metal, for example, platinum, palladium, rhodium, or the like. In addition, a compound containing alkali metal, alkali earth metal, rare-earth element, transition metal, or the like can be used as the catalyst material. When a platinum catalyst is disposed on the cell walls 140, the honeycomb unit 120 is impregnated with a dinitrodiammine platinum nitric acid solution ($[Pt(NH_3)_2(NO_2)_2]HNO_3$), or the like, and heat is applies to the impregnated honeycomb unit 120. In addition, the catalyst can include one of potassium, magnesium, barium, calcium, or the like.

EXAMPLES

Next, examples of the embodiment of the present invention are described.

Example 1

First, a mixture composition was obtained by mixing and kneading 2250 parts by weight of zeolite, alumina fibers of 680 parts by weight (average fiber length is 100 μm and average fiber diameter is 6 μm), 2600 parts by weight of alumina sol (solids content 30 wt %), 320 parts by weight of methylcellulose, platicizer, and a lubricant agent (Unilube). Then a honeycomb unit molded body whose cross section is fan-shaped (¼ circle in cross section; 69 mm radius) was obtained by molding the composition with the use of an extrusion molding machine.

In this honeycomb unit 120, the first and second directions L1 and L2 of the cell walls were substantially orthogonal to each other when the honeycomb unit 120 was viewed from the end face, and the angle between the cell walls 140 and the straight lines (radius of the ¼ circle in cross section) of the fan-shaped honeycomb unit 120 was 45 degrees when the honeycomb unit 120 is viewed from the cross section. That is, the first direction L1 (or the second direction L2) of the cell walls 140 has 45 degrees as the minimum angle relative to the extending directions of the adhesive layers 180.

Next, the honeycomb unit molded body was sufficiently dried and degreased by using a microwave drying apparatus and a hot air drying apparatus at 400° C. for 2 hours. Then firing was applied to the dried and degreased honeycomb unit molded body at 700° C. for 2 hours. With this, the honeycomb unit 120 whose cross section is a fan shape having two sides (69 mm) and one arc was obtained. The thickness of the cell walls 140 was 0.2 mm and the cell density was 93 pieces per cm².

Next, an adhesive layer paste was prepared by mixing 26 wt % of aluminum particles (average particle diameter is 2 μm), 37 wt % of alumina fibers, 31.5 wt % of alumina sol (solids content 30 wt %), 0.5 wt % of carboxymethyl cellulose, and 5 wt % of water. The four honeycomb units 120 were adhered to each other by applying the prepared adhesive layer paste onto the sides of the four honeycomb units 120. With this, a honeycomb unit aggregated body was obtained. The adhesive layer paste was applied to the sides of the honeycomb units so that the thickness of adhesive layers 180 became uniformly 1 mm, then heat was applied at 120° C. and was solidified.

Next, a coating layer paste (the same material as the adhesive layer paste) was applied to the peripheral surface of the honeycomb unit aggregated body and the coating layer 190 of 0.5 mm thickness was formed by being solidified with heat. With this, the honeycomb structure 100 was obtained.

Example 2

A honeycomb structure 100 was manufactured by a method similar to the method of Example 1. However, in Example 2, the honeycomb structure 100 was manufactured so that the first direction L1 (or the second direction L2) of the cell walls 140 in the honeycomb unit 120 had the minimum angle of 40 degrees relative to the extending directions of the adhesive layers 180.

Example 3

A honeycomb structure 100 was manufactured by a method similar to the method of Example 1. However, in Example 3, the honeycomb structure 100 was manufacture so that the first direction L1 (or the second direction L2) of the cell walls 140 in the honeycomb unit 120 had the minimum angle of 22.5 degrees relative to the extending directions of the adhesive layers 180.

Comparative Example 1

A honeycomb structure 100 was manufactured by a method similar to the method of Example 1. However, in Comparison Example 1, the honeycomb structure 100 was manufactured so that the first direction Li (or the second direction L2) of the cell walls 140 in the honeycomb unit 120 had the minimum angle of 10 degrees relative to the extending directions of the adhesive layers 180.

Comparative Example 2

A honeycomb structure 100 was manufactured by a method similar to the method of Example 1. However, in Comparison Example 2, the honeycomb structure 100 was manufactured so that the first direction L1 of the cell walls 140 in the honeycomb unit 120 fitted relative to the extending directions of the adhesive layers 180. Therefore, the first direction L1 (or the second direction L2) of the cell walls 140 in the honeycomb unit 120 had the minimum angle of 0 degrees relative to the extending directions of the adhesive layers 180.

[Measurement of Isostatic Strength]

Isostatic strength of the honeycomb structures 100 of Example 1 through Example 3, and Comparative Examples 1 and 2 were measured. The isostatic strength is a compression failure load when a honeycomb structure is broken by isotropically applying a hydrostatic load to the honeycomb structure. Society of Automotive Engineers of Japan stipulates the isotropic strength in JASO M505-87. The entire contents of JASO M505-87 are hereby incorporated by reference.

The isostatic strength was measured under the following conditions. First, a metal plate (aluminum plate of 15 mm thickness) was disposed to both end faces of the honeycomb structure. Next, the honeycomb structure and the metal plates were wrapped by a urethane rubber sheet (2 mm thickness) and sealed. Then the sealed honeycomb structure was completely soaked in water, water pressure was increased, and the water pressure was measured when the honeycomb structure was broken.

Figure 9:
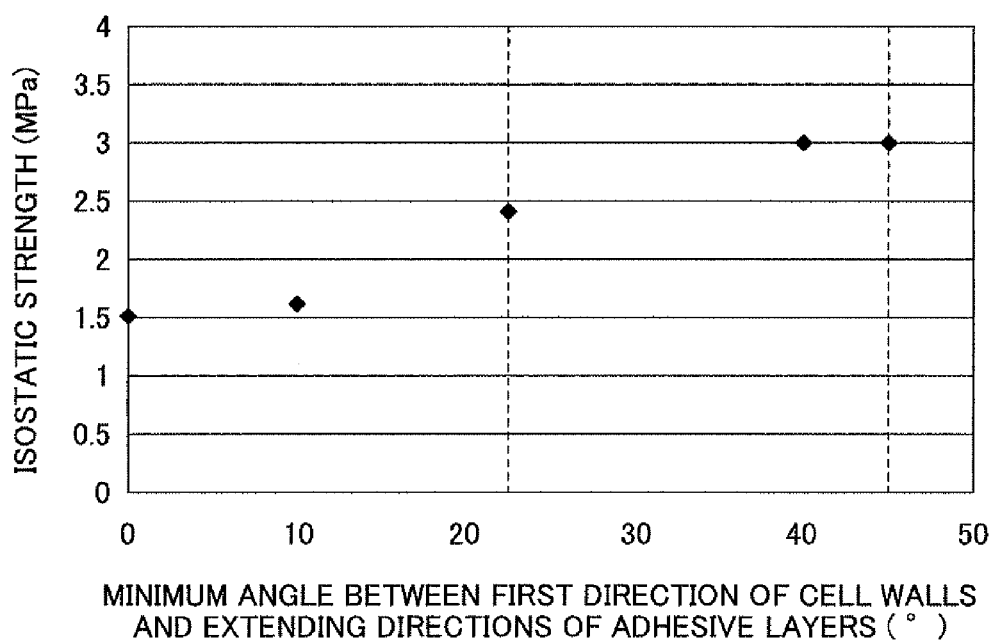
FIG. 9 is a graph showing a relationship between isostatic strength and minimum angles in the honeycomb structures of examples and comparative examples.

The measurement results of each honeycomb structure 100 are shown in Table 1. In addition, in FIG. 9, a relationship between the isostatic strength and the minimum angle is shown in the honeycomb structures 100 of Example 1 through Example 3 and Comparative Examples 1 and 2. FIG. 9 is a graph showing the relationship between the isostatic strength and the minimum angle in the honeycomb structures 100 of Example 1 through Example 3 and Comparative Examples 1 and 2. The minimum angle is the angle between the cell walls 140 and the adhesive layers 180 (the angle between the first direction L1 of the cell walls 140 in the honeycomb structure 100 and the extending directions of the adhesive layers 180).

TABLE 1

|  | Minimum Angle between First Direction of Cell Walls and Extending Directions of Adhesive layers (degrees) | Isostatic Strength (MPa) |
| --- | --- | --- |
| Example 1 | 45 | 3.0 |
| Example 2 | 40 | 3.0 |
| Example 3 | 22.5 | 2.4 |
| Comparative Example 1 | 10 | 1.6 |
| Comparative Example 2 | 0.0 | 1.5 |

As shown in Table 1 and FIG. 9, when the minimum angle between the first direction L1 of the cell walls 140 and the extending directions D1 and D2 of the adhesive layers 180 is approximately 22.5 to approximately 45 degrees, the isostatic strength of the honeycomb structures in Example 1 through Example 3 is significantly greater than that of the honeycomb structures in Comparative Examples 1 and 2.

Further, the present invention is not limited to the embodiment, but variations and modifications may be made without departing from the scope of the present invention.

What is claimed is:

1. A honeycomb structure having a longitudinal direction, comprising: a first end face; a second end face opposite to the first end face along the longitudinal direction; four honeycomb units each comprising: inorganic particles; an inorganic binder; and a plurality of cell walls extending from the first end face to the second end face to define a plurality of cells, the plurality of cell walls including a first cell walls extending along a first direction in a cross sectional plane perpendicular to the longitudinal direction and a second cell walls extending along a second direction substantially perpendicular to the first direction in the cross sectional plane; and adhesive layers provided between the four honeycomb units to connect the four honeycomb units each other, the adhesive layers extending in a first extending direction and a second extending direction substantially perpendicular to the first extending direction in the cross sectional plane, a minimum angle between the first direction and the first extending direction or the second extending direction is approximately 22.5 degrees to approximately 45 degrees, wherein each of the honeycomb units has a fan shape in the cross sectional plane, wherein: each of the cells are through holes that are open at both an upstream end and a downstream end thereof and each of the four honeycombs units forming substantially a quarter of an overall cross sectional area of the honeycomb structure.

2. The honeycomb structure as claimed in claim 1, wherein:
the inorganic particles include at least one of alumina, ceria, zirconia, titania, silica, zeolite, and mullite.

3. The honeycomb structure as claimed in claim 2, wherein:
the zeolite is ion-exchanged zeolite by using Cu, Fe, Ni, Zn, Mn, or Co.

4. The honeycomb structure as claimed in claim 1, wherein:
the inorganic binder includes at least one of alumina sol, silica sol, titania sol, liquid glass, meerschaum, and attapulgite.

5. The honeycomb structure as claimed in claim 1, wherein:
the honeycomb units further comprise inorganic fibers.

6. The honeycomb structure as claimed in claim 5, wherein:
the inorganic fibers include at least one of alumina, silica, silicon carbide, silica-alumina, glass, potassium titanate, and aluminum borate.

7. The honeycomb structure as claimed in claim 5, wherein:
an average aspect ratio of the inorganic fibers is approximately 10 to approximately 1000.

8. The honeycomb structure as claimed in claim 5, wherein:
an amount of the inorganic fibers in the honeycomb units is approximately 3 wt % to approximately 50 wt %.

9. The honeycomb structure as claimed in claim 1, wherein:
a shape of the honeycomb structure in the cross sectional plane is substantially a circle, an ellipse, or an oval.

10. The honeycomb structure as claimed in claim 1, wherein:
a catalyst is provided on the cell walls.

11. The honeycomb structure as claimed in claim 10, wherein:
the catalyst includes at least one of noble metal, alkali metal, and alkali earth metal.

12. The honeycomb structure as claimed in claim 11, wherein:
the catalyst includes at least one of platinum, palladium, and rhodium.

13. The honeycomb structure as claimed in claim 11, wherein:
the catalyst includes at least one of potassium, magnesium, barium, and calcium.

14. The honeycomb structure as claimed in claim 1, wherein:
the honeycomb structure is formed by a cutting process for forming a peripheral surface.

15. The honeycomb structure as claimed in claim 1, wherein:
a cell density of each of the honeycomb units is approximately 15.5 pieces per cm$^2$ to approximately 186 pieces per cm$^2$.

16. The honeycomb structure as claimed in claim 1, wherein:
a thickness of the cell walls is approximately 0.1 mm to approximately 0.4 mm.

17. The honeycomb structure as claimed in claim 1, wherein:
a specific surface area of the honeycomb units is approximately 25000 m$^2$/L to approximately 70000 m$^2$/L.

18. The honeycomb structure as claimed in claim 1, wherein:
an amount of the inorganic particles contained in the honeycomb units is approximately 30 wt % to approximately 90 wt %.

19. The honeycomb structure as claimed in claim 1, further comprising:
a coating layer formed on a peripheral surface of the honeycomb structure.

20. An exhaust gas treating apparatus, comprising: a honeycomb structure having a longitudinal direction, comprising: a first end face; a second end face opposite to the first end face along the longitudinal direction; four honeycomb units each comprising: inorganic particles; an inorganic binder; and a plurality of cell walls extending from the first end face to the second end face to define a plurality of cells, the plurality of cell walls including a first cell walls extending along a first direction in a cross sectional plane perpendicular to the longitudinal direction and a second cell walls extending along a second direction substantially perpendicular to the first direction in the cross sectional plane; and adhesive layers provided between the four honeycomb units to connect the four honeycomb units each other, the adhesive layers extending in a first extending direction and a second extending direction substantially perpendicular to the first extending direction in the cross sectional plane, a minimum angle between the first direction and the first extending direction or the second extending direction is approximately 22.5 degrees to approximately 45 degrees; a metal casing containing the honeycomb structure; and a holding sealing member disposed between the honeycomb structure and the metal casing to hold the honeycomb structure at a predetermined position in the metal casing, wherein each of the honeycomb units has a fan shape in the cross sectional plane, wherein: each of the cells are through holes that are open at both an upstream end and a downstream end thereof and each of the four honeycombs units forming substantially a quarter of an overall cross sectional area of the honeycomb structure.

21. The exhaust gas treating apparatus as claimed in claim 20, wherein:
the inorganic particles include at least one of alumina, ceria, zirconia, titania, silica, zeolite, and mullite.

22. The exhaust gas treating apparatus as claimed in claim 21, wherein:
the zeolite is ion-exchanged zeolite by using Cu, Fe, Ni, Zn, Mn, or Co.

23. The exhaust gas treating apparatus as claimed in claim 20, wherein:
the inorganic binder includes at least one of alumina sol, silica sol, titania sol, liquid glass, meerschaum, and attapulgite.

24. The exhaust gas treating apparatus as claimed in claim 20, wherein:
the honeycomb units further comprise inorganic fibers.

25. The exhaust gas treating apparatus as claimed in claim 24, wherein:
the inorganic fibers include at least one of alumina, silica, silicon carbide, silica-alumina, glass, potassium titanate, and aluminum borate.

26. The exhaust gas treating apparatus as claimed in claim 24, wherein:
an average aspect ratio of the inorganic fibers is approximately 10 to approximately 1000.

27. The exhaust gas treating apparatus as claimed in claim 24, wherein:
an amount of the inorganic fibers in the honeycomb units is approximately 3 wt % to approximately 50 wt %.

28. The exhaust gas treating apparatus as claimed in claim 20, wherein:
a shape of the honeycomb structure in the cross sectional plane is substantially a circle, an ellipse, or an oval.

29. The exhaust gas treating apparatus as claimed in claim 20, wherein:
a catalyst is provided on the cell walls.

30. The exhaust gas treating apparatus as claimed in claim 29, wherein:
the catalyst includes at least one of noble metal, alkali metal, and alkali earth metal.

31. The exhaust gas treating apparatus as claimed in claim 30, wherein:
the catalyst includes at least one of platinum, palladium, and rhodium.

32. The exhaust gas treating apparatus as claimed in claim 30, wherein:
the catalyst includes at least one of potassium, magnesium, barium, and calcium.

33. The exhaust gas treating apparatus as claimed in claim 20, wherein:
the honeycomb structure is formed by a cutting process for forming a peripheral surface.

34. The exhaust gas treating apparatus as claimed in claim 20, wherein:
a cell density of each of the honeycomb units is approximately 15.5 pieces per $cm^2$ to approximately 186 pieces per $cm^2$.

35. The exhaust gas treating apparatus as claimed in claim 20, wherein:
a thickness of the cell walls is approximately 0.1 mm to approximately 0.4 mm.

36. The exhaust gas treating apparatus as claimed in claim 20, wherein:
a specific surface area of the honeycomb units is approximately 25000 $m^2$/L to approximately 70000 $m^2$/L.

37. The exhaust gas treating apparatus as claimed in claim 20, wherein:
an amount of the inorganic particles contained in the honeycomb units is approximately 30 wt % to approximately 90 wt %.

38. The exhaust gas treating apparatus as claimed in claim 20, further comprising:
a coating layer formed on a peripheral surface of the honeycomb structure.

* * * * *